United States Patent [19]

Osborn

[11] 4,301,768
[45] Nov. 24, 1981

[54] SYSTEM FOR AND METHOD OF FEEDING FOWL

[75] Inventor: Denis L. Osborn, Glendale, Calif.

[73] Assignee: H. W. Hart Mfg. Co., Glendale, Calif.

[21] Appl. No.: 58,817

[22] Filed: Jul. 19, 1979

[51] Int. Cl.$^3$ .............................................. A01K 39/01
[52] U.S. Cl. ............................... 119/51 R; 119/51.11; 119/52 AF
[58] Field of Search .................. 119/52 AF, 51 R, 18, 119/61, 51.11

[56] References Cited

U.S. PATENT DOCUMENTS

| | | | |
|---|---|---|---|
| 2,738,765 | 3/1956 | Hart | 119/52 AF |
| 2,794,421 | 6/1957 | Rose et al. | 119/52 AF |
| 2,934,199 | 4/1960 | Winkler | 119/52 AF |
| 3,433,205 | 3/1969 | Pittard | 119/52 AF |
| 3,543,283 | 11/1970 | Cataline | 119/52 AF |
| 3,946,701 | 3/1976 | Hostetler | 119/18 |

Primary Examiner—Hugh R. Chamblee
Attorney, Agent, or Firm—Ellsworth R. Roston; Charles H. Schwartz

[57] ABSTRACT

Apparatus introduces particles of feed to fowl on a controlled basis. The apparatus includes chain link means disposed in a closed loop and movable in the direction of the loop. Means such as discs are disposed at spaced intervals in the loop for moving the particles of feed along the loop and for inhibiting the removal of the particles of feed by the fowl during such movement.

Storage means receive the chain link means for holding the particles of feed and for guiding the movement of the chain link means. Such storage means may comprise a trough open at the top and dimensioned to hold the discs in a nested relationship. The discs may have an annular shape and the trough may have a semi-annular shape.

The closed loop defined by the chain link means may have straight sides and rounded corners. The storage means may be closed and enlarged in section at the rounded corners. This enlargement may be defined by an oval-shaped configuration of the storage means in section.

Means may control the introduction of the particles of feed to the storage means. Such means may include a hopper having an opening whose size may be controlled by a manual adjustment in the positioning of a plate.

Means drive the chain link means at a relatively high speed in the direction of the loop. Means discontinue the operation of the driving means after a limited, but controlled, period of time.

21 Claims, 8 Drawing Figures

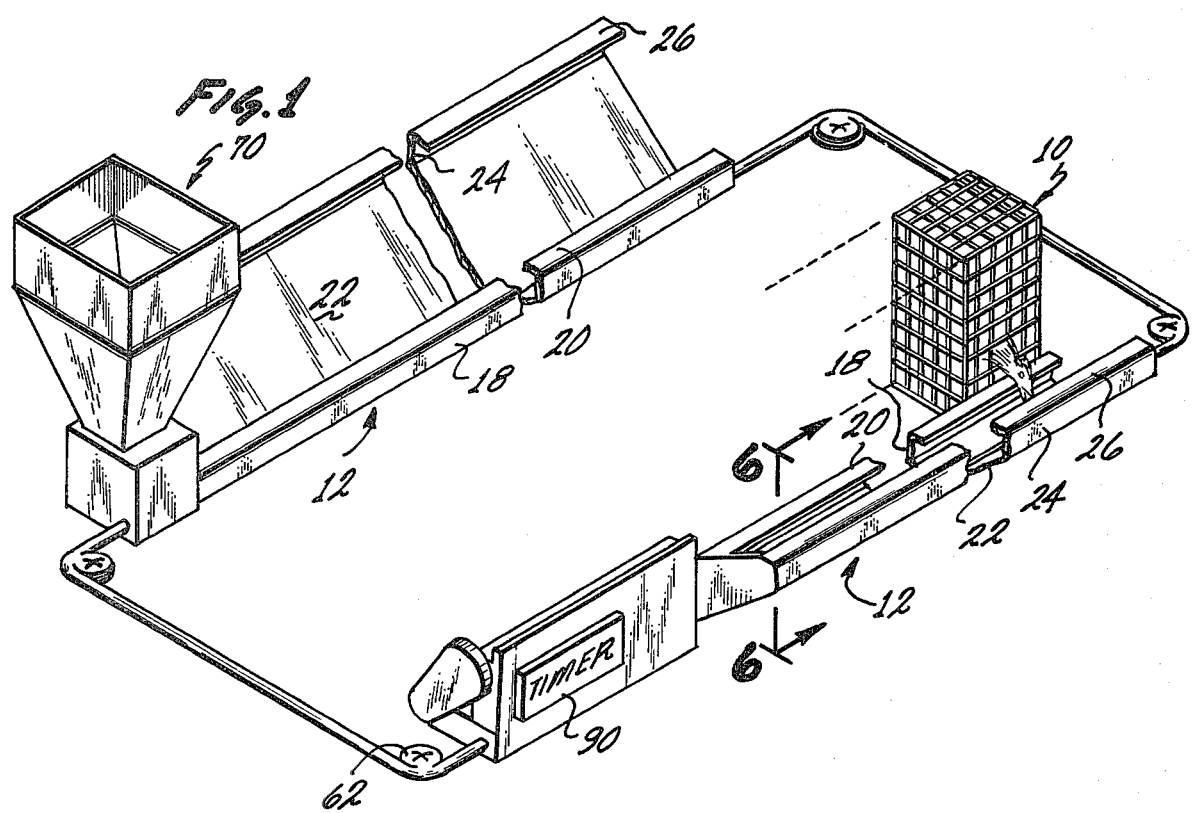
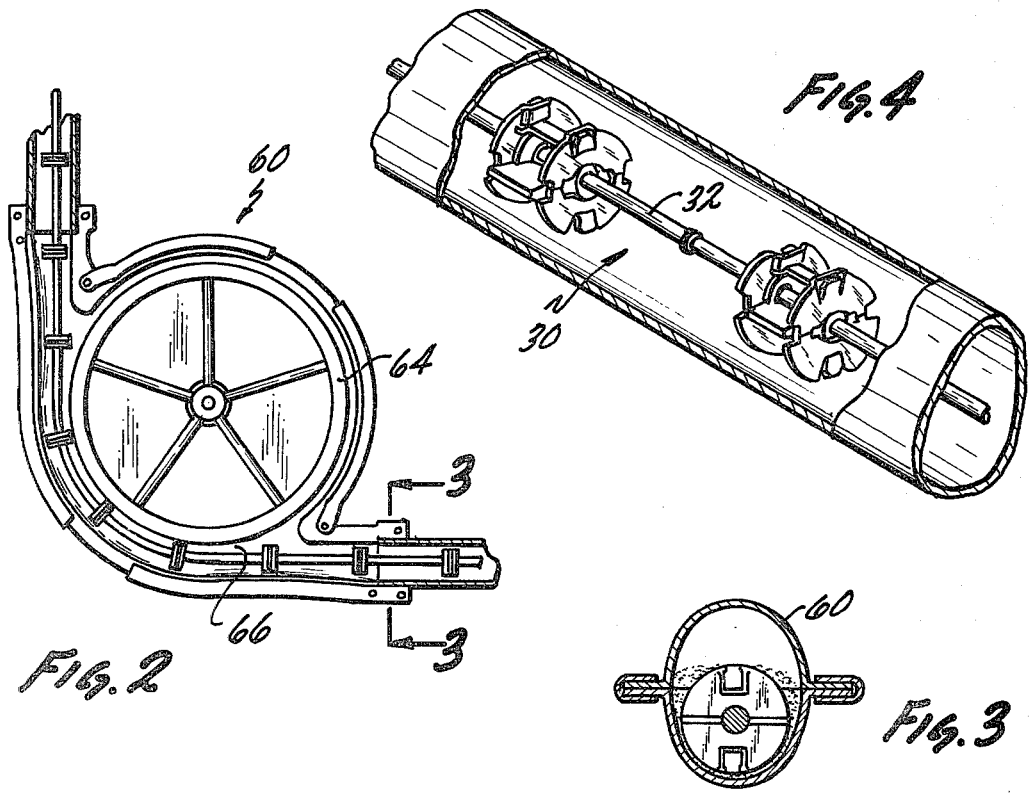

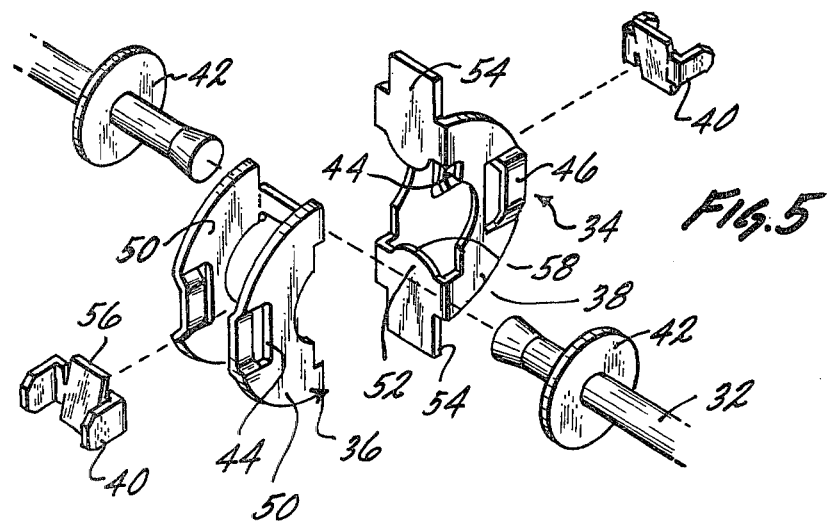
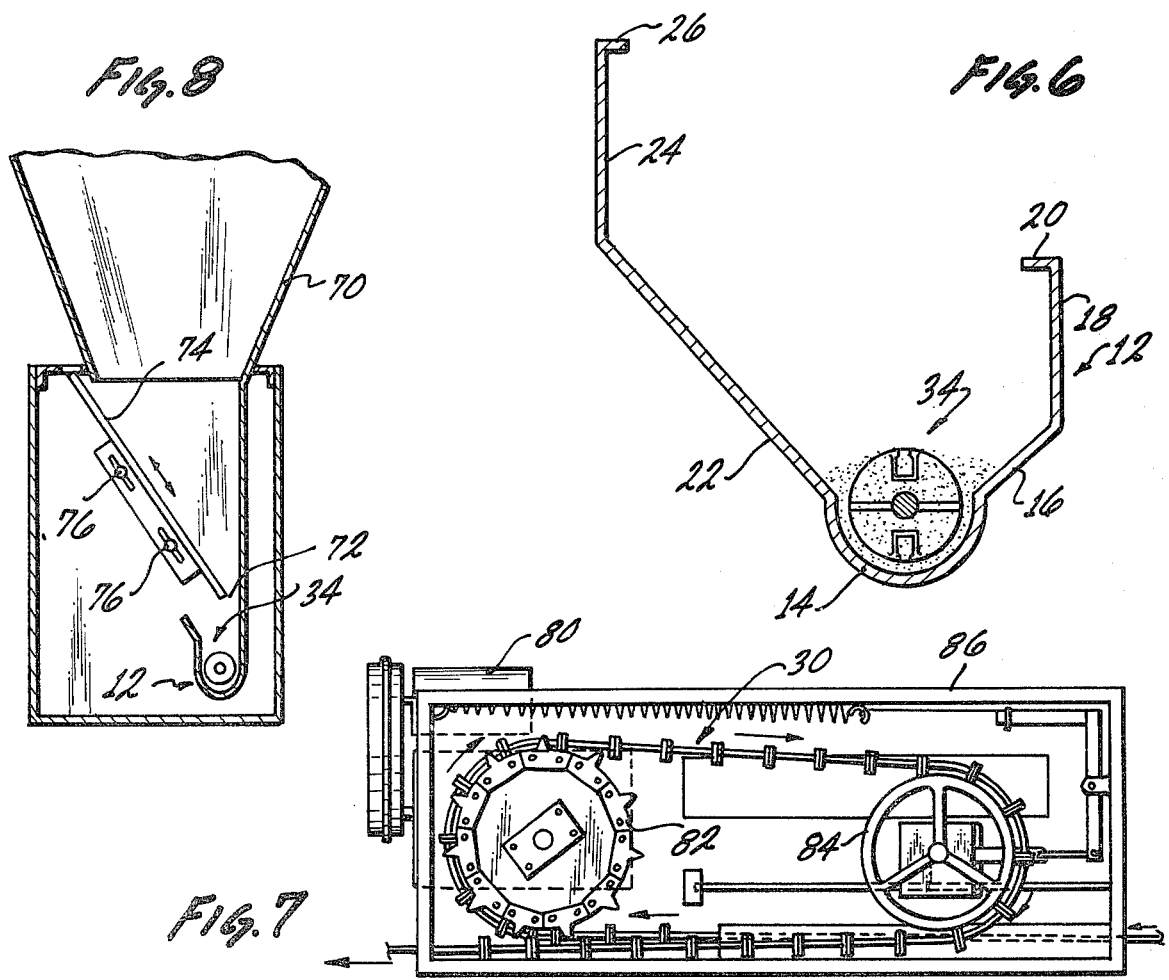

SYSTEM FOR AND METHOD OF FEEDING FOWL

This invention relates to apparatus for introducing particles of feed to fowl on a controlled basis. More particularly, this invention relates to apparatus for providing for the introduction of substantially equal, and controlled, amounts of feed to each of the fowl in a plurality at precisely controlled intervals of time to produce optimum growth of the fowl on an economic basis.

In recent years, fowl such as chicken have become an increasingly important staple of food for people throughout the world. This has occurred for several reasons. One reason has been that beef is believed to produce cholesterol and produce heart problems. Another reason is that beef prices have risen to high levels while prices of fowl have remained relatively low. The price of fowl has remained low in comparison to beef because fowl have been bred and raised on a somewhat scientific and assembly-line basis.

In spite of the advances that have been made in breeding and raising fowl on a scientific and assembly-line basis, a number of significant problems still remain. For example, the feed has been introduced to fowl continuously, or almost continuously, at a relatively slow rate. This has provided an opportunity for the strong or aggressive fowl to consume a disproportionate share of the feed in comparison to the amount of feed consumed by the weak or timid fowl. As a result, the strong or aggressive fowl have grown more than the weak or timid fowl. As the fowl have matured, the problem has accordingly become aggravated.

The introduction of feed at a slow rate has also produced another problem. This has occurred because the well-fed fowl have tended to select the choice particles from the feed. This has caused the weak or timid fowl to have a somewhat unbalanced diet.

Since fowl are introduced to the market for consumption after they have been raised for a particular period of time, the size of the fowl has been nonuniform. Furthermore, the proportion of meat relative to bone has been greater on some fowl than on others. This has tended to produce undesirable consequences in the marketplace.

A number of attempts have been made to resolve the problems discussed above. However, such attempts have not been entirely successful. As of this date, fowl still tend to be fed continuously, or almost continuously, by the introduction of feed at a relatively slow rate.

This invention provides apparatus which overcomes the above disadvantages. The apparatus provides for the introduction of feed to fowl at a high rate for a limited, but controlled, period of time. During this limited period of time, the apparatus is operative to move the feed to the fowl, which are disposed in cages. Furthermore, during this period, the apparatus prevents the fowl from consuming any of the feed. After this limited period of time, which may be five (5) minutes, the operation of the apparatus is discontinued. This provides all of the fowl in the cages with substantially equal opportunites to consume the feed. This cycle may be repeated after particular time intervals such as three (3) hours.

The apparatus of this invention includes chain link means disposed in a closed loop and movable in the direction of the loop. Means such as discs are disposed at spaced intervals in the loop for moving the particles of feed along the loop and for inhibiting the removal of the particles of feed by the fowl during such movement.

Storage means receive the chain link means for holding the particles of feed and for guiding the movement of the chain link means. Such storage means may comprise a trough open at the top and dimensioned to hold the discs in a nested relationship. The discs may have an annular shape and the troughs may have a semi-annular shape.

The closed loop defined by the chain link means may have straight sides and rounded corners. The storage means may be closed and enlarged in section at the rounded corners. This enlargement may be defined by an oval-shaped configuration of the storage means in section.

Means may be provided for controlling the introduction of the particles of feed to the storage means. Such means may include a hopper having an opening whose size may be controlled by a manual adjustment in the positioning of a plate.

Means are provided for driving the chain link means at a relatively high speed in the direction of the loop. Means are also provided for discontinuing the operation of the driving means after a limited, but controlled, period of time.

In the drawings:

FIG. 1 is a schematic perspective view of apparatus constituting one embodiment of this invention for providing a controlled introduction of feed to fowl by a movement of the feed in a closed loop;

FIG. 2 is an enlarged plan view of apparatus included in the embodiment shown in FIG. 1 for directing the feed around rounded corners in the closed loop;

FIG. 3 is an enlarged sectional view on substantially the line 2—2 in FIG. 2 and illustrates additional details of the apparatus shown in FIG. 2 for directing the feed around the rounded corners in the closed loop;

FIG. 4 is an enlarged perspective view of apparatus included in the embodiment shown in FIG. 1 for moving the feed along straight portions of the loop where the fowl are not located;

FIG. 5 is an exploded perspective view of a pair of pusher means shown in FIG. 4 for moving the feed in the closed loop;

FIG. 6 is an enlarged sectional view substantially on the line 6—6 of FIG. 1 and illustrates the positioning of the discs relative to a trough holding the feed for the fowl;

FIG. 7 is an enlarged elevational view of drive apparatus included in the embodiment shown in FIG. 1; and FIG. 8 is an enlarged elevational view, in section, of apparatus included in the embodiment shown in FIG. 1 for providing a controlled introduction of feed at an adjustable rate.

In one embodiment of the invention, apparatus is provided for introducing particles of feed to fowl. The apparatus is disposed in a closed loop preferably defined by straight sides and rounded corners. The apparatus is disposed adjacent cages, generally indicated at 10, for holding the fowl. The cages 10 are preferably disposed adjacent the straight sides of the closed loop so that fowl can lean through the cages and remove the particles of feed from the closed loop. For example, four (4) fowl may lean through each cage 10 to obtain particles of feed.

The apparatus constituting this invention includes support means such as troughs generally indicated at 12. The troughs 12 are preferably disposed along the straight sides of the closed loop at a position adjacent the cages 10 to hold the particles of feed. The troughs 12 include a bottom holder portion 14 (FIG. 6) preferably having a semi-annular shape in section. A baffle plate 16 extends upwardly at an oblique forward angle from the holding portion 14. A retarding plate 18 is then extended upwardly from the baffle plate 16 and is preferably disposed at a sharper angle to the vertical than the baffle plate. The retarding plate 18 preferably has a vertical disposition. An inwardly turned lip 20 is provided at the top end of the retarding plate.

A baffle plate 22 also extends upwardly from the opposite end of the holding portion 14. The baffle plate 22 is preferably disposed at an oblique rearward angle so as to define a funnel relationship with the baffle plate 16. The baffle plate 22 is preferably provided with an increased length relative to the baffle plate 16. A retarding plate 24 extends upwardly from the baffle plate 22 and is preferably disposed vertically. An inwardly turned lip 26 is provided at the upper end of the retarding plate 24.

Chain link means generally indicated at 30 are disposed in the troughs 12 and are movable in the direction of the closed loop. The chain link means include rods 32 and pusher means or links such as discs, generally indicated at 34, disposed at spaced intervals along the rods. The chain link means may be constructed in a manner such as disclosed in detail and claimed in U.S. Pat. No. 3,722,644 issued on Mar. 27, 1973, to Harold A. Hart and Edward A. Southworth for "Articulated Pusher Conveyor Chain" and assigned of record to the assignee of record of this application.

The discs 34 are preferably disposed in nested relationship in the troughs 12. The discs 34 are preferably provided with an annular configuration in section. When the discs have this configuration, the holding positions 14 (FIG. 6) of the troughs 12 preferably have a semi-annular configuration in section.

The discs 34 are paired and are formed from a pair of sheet metal members 36 and 38 each having a semi-annular configuration in section, a pair of U-shaped clips 40 and a pair of socket washers 42 which receive the rods 32. Each of the members 36 and 38 is provided with a pair of diametrically opposite slots 44 to receive the U-shaped clips 40. Each of the members 36 and 38 is further formed with an offset portion 46 which forms a radial recess to seat an arm of a U-shaped clip 40.

Each of the members 36 and 38 is of U-shaped cross-sectional configuration to provide a pair of spaced parallel semi-annular wings 50 with the two wings interconnected by two spaced integral coplanar webs 52. The member 38 is provided with a pair of opposite tongues 54. The tongues 54 are bent over the webs 52 to unite the members 36 and 38.

The U-shaped clips 40 are lanced at two spaced positions to define a tongue 56. The tongues 56 extend into the region between the two socket washers 42 to maintain the washers in spaced relationship. This spaced relationship is also maintained by curved lips 58 which extend slightly radially inwardly from the webs 52 of the members 36 and 38. This inward extension of the lips 58 prevents the washers 42 from moving toward each other. Thus, the socket washers 42 are peripherally engaged at four positions, angularly spaced at 90°, to captivate them against the inner surfaces of the two discs 34 formed by the members 36 and 38.

Apparatus is disposed at the rounded corners of the closed loop for facilitating the movement of the feed around the corners. The apparatus includes hollow support means such as a housing, generally indicated at 60 (FIGS. 2 and 3), which is enclosed and which is enlarged in cross-section. Preferably, the housing 60 has an oval configuration such as shown in FIG. 3. The discs 34 are disposed at an intermediate position between the top and bottom of the housing so that friction between the discs and the housing will be minimized as the discs move through the rounded corners.

A flat enclosure 62 is disposed at the rounded corners of the closed loop. A wheel 64 is disposed in the enclosure 62. The wheel 64 defines with the housing 60 a passage 66 which is open at the positions adjacent to the wheel. The chain link means 30 are movable through this passage with the discs 34 in engagement with the wheel to rotate the wheel. In this way, friction is minimized as the discs 34 change angles in their movement through the rounded corners.

A hopper generally indicated at 70 is disposed in communication with the closed loop to introduce controlled amounts of feed to the loop. The hopper 70 includes an opening 72 (FIG. 8) the size of which is controlled by manual adjustments in the positioning of a plate 74. The plate may be fixedly held in position, after adjustment, by tightening screws 76. An agitator (not shown) may be included in the hopper to insure a uniform flow of feed into the troughs.

Drive means (FIG. 7) are also included in the embodiment shown in the drawings. The drive means include a motor 80 operatively coupled to a sprocket wheel 82 to drive the sprocket wheel. The chain link means 30 are extended around the sprocket wheel 82 and a sprocket wheel 84, both sprocket wheels being disposed in a housing 86. The chain link means extend from the housing 86 through an opening at the left end of the housing 86 in FIG. 7 and return into the housing to the sprocket wheel 82 through an opening at the right end of the housing.

The motor 80 drives the chain link means 30 at a relatively high speed in the closed loop. For example, the chain link means may move at speeds of approximately one hundred and forty-five feet per minute (145'/min). These speeds are sufficiently high so that the fowl do not dare to remove any particles of feed from the trough 12 while the chain link means 30 are moving. This is particularly true because the discs 34 extend outwardly from the rods 32 and tend to ram against the beaks of any fowl which insert their beaks into the trough. Furthermore, the beaks of the fowl will tend to be caught in the space between the trough 12 and the discs 34 if the fowl should try to remove particles of feed from the trough while the discs are moving. This results from the nesting relationship between the discs 34 and the holding portion 14 of the trough 12.

While the discs 34 are moving in the closed loop, they tend to move the particles of feed along the length of the loop. The movement of the particles of feed is facilitated by the nesting relationship between the discs 32 and the holding portions 14 of the troughs 12. Such movement is also facilitated by the high speed of movement of the discs 34 and by the enclosed housings 60 at the rounded corners.

After the discs 34 have moved for a limited, but controlled, period of time, a timer 90 (FIG. 1) becomes activated to discontinue the operation of the motor 80. This period of time may be in the order of five (5) to seven (7) minutes. At the end of this time period, the fowl are able to line up in their cages and consume the particles of feed in the troughs 12. A sufficient amount of feed exists in the troughs for each of the fowl to receive a precalculated feeding. This amount is precalculated to provide an optimal growth of the fowl at a minimal expense. For example, the amount of feed in the trough may be in the order of three-tenths pounds (0.3#) to six-tenths pound (0.6#) per foot. Since the fowl are aligned adjacent the troughs, each of the fowl has an equal opportunity to consume the feed. Furthermore, the fowl have an opportunity to clean the troughs after each feeding.

The troughs 12 are shaped to prevent any wastage of the feed. For example, if the fowl should bill the particles of feed or toss off particles of feed at they eat, the particles tend to impact on the baffle plate 22 and return to the holding portion 14 of the trough. The baffle plate 22 is provided with a relatively great height to insure that all of the billed or tossed particles will return to the trough. The inclusion of the retarding plates 18 and 24 and the lips 20 and 26 also facilitates the return of all of the billed particles to the holding portions 14 of the troughs 12. Furthermore, the provision of the baffle plates 16 and 22 allows the fowl to insert their beaks conveniently into the holding portion 14 and remove particles of the feed.

The timer 90 provides for operation of the motor 80 only after precisely controlled periods of time. For example, the motor may be operated three (3) or four (4) times per day at time intervals of approximately three (3) hours. As previously described, each operation may be for a period of five (5) to seven (7) minutes. As a result, the motor may be operated for a total of approximately fifteen (15) to twenty-eight (28) minutes per day. This is in contrast to prior art systems which operate as much as three (3) to six (6) hours per day. This represents a considerable savings in energy consumption to the business person growing the fowl. The energy savings is enhanced because the chain link means 30 is light. Thus, the apparatus is able to operate properly at high speeds with a motor 80 of less than one horsepower (1 HP) to deliver as much as fifteen hundred pounds (1500#) of feed per hour.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for providing for the introduction of particles of feed to fowl disposed in a series of cages,
    a chain disposed in a continuous loop and having at spaced intervals links for advancing the particles of feed along the loop,
    a trough shaped to guide the movement of the chain, and particularly the links, at high speeds and to retain the particles of feed advanced by the chain,
    means operatively coupled to the chain for advancing the chain at a speed greater than the ability of the fowl to remove the feed from the trough during the movement of the chain, and
    means associated with the advancing means for discontinuing the operation of the advancing means after a relatively short, but controlled, period of time to provide a stationary disposition of the particles of feed in adjacent relationship to the cages.

2. The combination set forth in claim 1 wherein
    the trough is shaped to conform substantially to the configuration of the links to provide for an advance of the particles of feed by the links along the trough.

3. The combination set forth in claim 2 wherein
    the trough is provided with a vertical extension along its back side to prevent particles of feed from being lost from the trough by the tossing of the particles of feed by the fowl.

4. The combination set forth in claim 2 wherein
    means are included for providing an adjustably controlled introduction of feed into the continuous loop.

5. In combination for providing for the introduction of particles of feed to fowl,
    chain link means disposed in a closed loop and movable in a particular path defined by the loop,
    means disposed at spaced intervals in the particular path for providing for the movement of the particles of feed in the particular path and for inhibiting the removal of the particles of food by the fowl during the movement of the chain link means in the particular path,
    storage means disposed in particular path for holding the feed particles and for guiding the chain link means in moving in the particular path,
    means for providing for a controlled introduction of the particles of feed to the storage means,
    drive means for providing a controlled movement of the chain link means in the particular path at sufficiently high speeds to prevent the fowl from removing the particles of feed from the storage means during the movement of the chain link means in the particular path, and
    means for discontinuing the operation of the drive means after a limited period of time.

6. The combination set forth in claim 5 wherein
    the chain link means defines straight sides and rounded corners in the particular path and wherein means are included at the rounded corners to facilitate the movement of the chain link means in the particular path.

7. The combination set forth in claim 6 wherein
    the storage means at the rounded corners are closed and are enlarged in the vertical direction to facilitate the movement of the particles of feed through the rounded corners.

8. In combination for providing for the introduction of feed to fowl,
    chain link meand disposed in a particular path for providing for a movement of the particles of feed in the particular path where the particular path has straight sides and rounded corners,
    pusher means provided in the particular path at spaced intervals for facilitating the movement of the particles of feed in the particular path and for inhibiting the removal of the particles of feed by the fowl during such movement,
    storage means disposed along the straight sides of the particular path to hold the particles of feed and receive the chain link means and define a cooperative relationship with the pusher means for receiving the particles of feed moved by the pusher means,
    means disposed at the rounded corners of the particular path for facilitating the movement of the chain link means around the rounded corners, and the storage means being covered and enlarged at the rounded corners to facilitate the movement of the particles of the feed in the particular path.

9. The combination set forth in claim 8 wherein the storage means defines a nested relationship with the pusher means along at least the straight sides of the particular path and wherein the storage means is provided with front and rear walls and is vertically extended along the rear wall to inhibit the removal of particles of feed from the storage means by the tossing of particles by the fowl.

10. The combination set forth in claim 9 wherein the pusher means are annular and the storage means defines the lower half of an annulus in section at least along the straight sides and the storage means is oval shaped at the rounded corners.

11. The combination set forth in claim 10 wherein the pusher means are nested in the storage means and wherein drive means are provided for driving the pusher means along the particular path at the relatively high speeds greater than the ability of the fowl to remove particles of feed from the storage means and wherein timer means are provided for discontinuing the operation of the drive means after a limited, but controlled, period of time.

12. The combination set forth in claim 10 wherein adjustable means are provided for controlling the rate at which the particles of feed are introduced to the storage means.

13. In combination for providing for the introduction of particles of feed to fowl disposed in a series of cages, storage means having a particular configuration, chain link means disposed in the storage means and having a looped configuration and movable in the direction of the closed loop,
pusher means disposed at spaced intervals along the chain link means and included in the chain link means and having a nested relationship with the storage means for moving the particles of feed along the storage means in accordance with the movements of the chain link means,
feed control means adjustably disposed relative to the storage means for providing for the introduction of the particles of feed to the storage means at a controlled rate dependent upon the adjustments of the feed control means,
drive means for driving the chain link means in the direction of the chain link means at a relatively rapid rate greater than that providing an opportunity for fowl to remove particles of feed from the storage means, and
timer means for discontinuing the operation of the drive means after a limited, but controlled, period of time.

14. The combination set forth in claim 13 wherein the feed control means includes a hopper having an opening communicating with the storage means and includes means for adjusting the opening between the hopper and the storage means to control the rate at which the particles of feed are introduced from the hopper to the storage means.

15. The combination set forth in claim 14 wherein the storage means have a semi-annular configuration in section and the pusher means have an annular configuration in which the lower half of the annulus corresponds to the semi-annular configuration of the storage means.

16. The combination set forth in claim 14 wherein the storage means are disposed in a closed loop defined by relatively straight sides and rounded corners and the storage means are closed at the rounded corners and are open at the straight sides to provide for the feeding of the fowl at the straight sides.

17. The combination set forth in claim 16 wherein the storage means have a semi-annular configuration in section and the pusher means have an annular configuration in which the lower half of the annulus corresponds to the semi-annular configuration of the storage means and wherein the storage means are provided with an increased height at the rounded corners.

18. A method of introducing particles of feed to fowl, including the following steps:
providing chain link means in a closed loop including straight sides and rounded corners,
providing an open trough along at least some of the sides of the chain link means,
providing, at spaced intervals in the chain link means, pusher means having a nested relationship with the trough for facilitating the movement of the particles of feed in the trough,
providing a closed trough enlarged in cross section at the rounded corners, and
providing for a movement of the chain link means in the closed loop at relatively high speeds greater than that at which the fowl are able to obtain feed particles from the trough and providing for such movement for a limited, but controlled, period of time to obtain an introduction of the particles of feed to the fowl only after the movement of the chain link means at such relatively high speeds.

19. A method as set forth in claim 18, including:
providing for the introduction of the feed to the trough at an adjustably controlled rate.

20. A method as set forth in claim 19 wherein the trough has substantially a semi-annular configuration and the pusher means has an annular configuration nesting in its lower half with the semi-annular configuration of the trough to facilitate the movement of the particles of feed in the trough by the pusher means.

21. A method of providing for the introduction of feed to fowl in a series of cages, including the following steps:
providing in a closed loop a chain link having spaced discs and disposing the chain link in a trough constructed to hold the particles of feed,
advancing the chain link at a sufficiently high speed to prevent the fowl from removing particles of the feed from the space between the spaced discs,
providing for the introduction of the particles of feed at a controlled rate to the chain link during the movement of the chain link at the high speed, and
interrupting the movement of the chain link after a particular time interval to present the particles of feed in the trough to the fowl in the cages for feeding.

* * * * *